Nov. 5, 1929.   J. JOHNSTON   1,734,212
SAW FRAME
Filed June 25, 1928
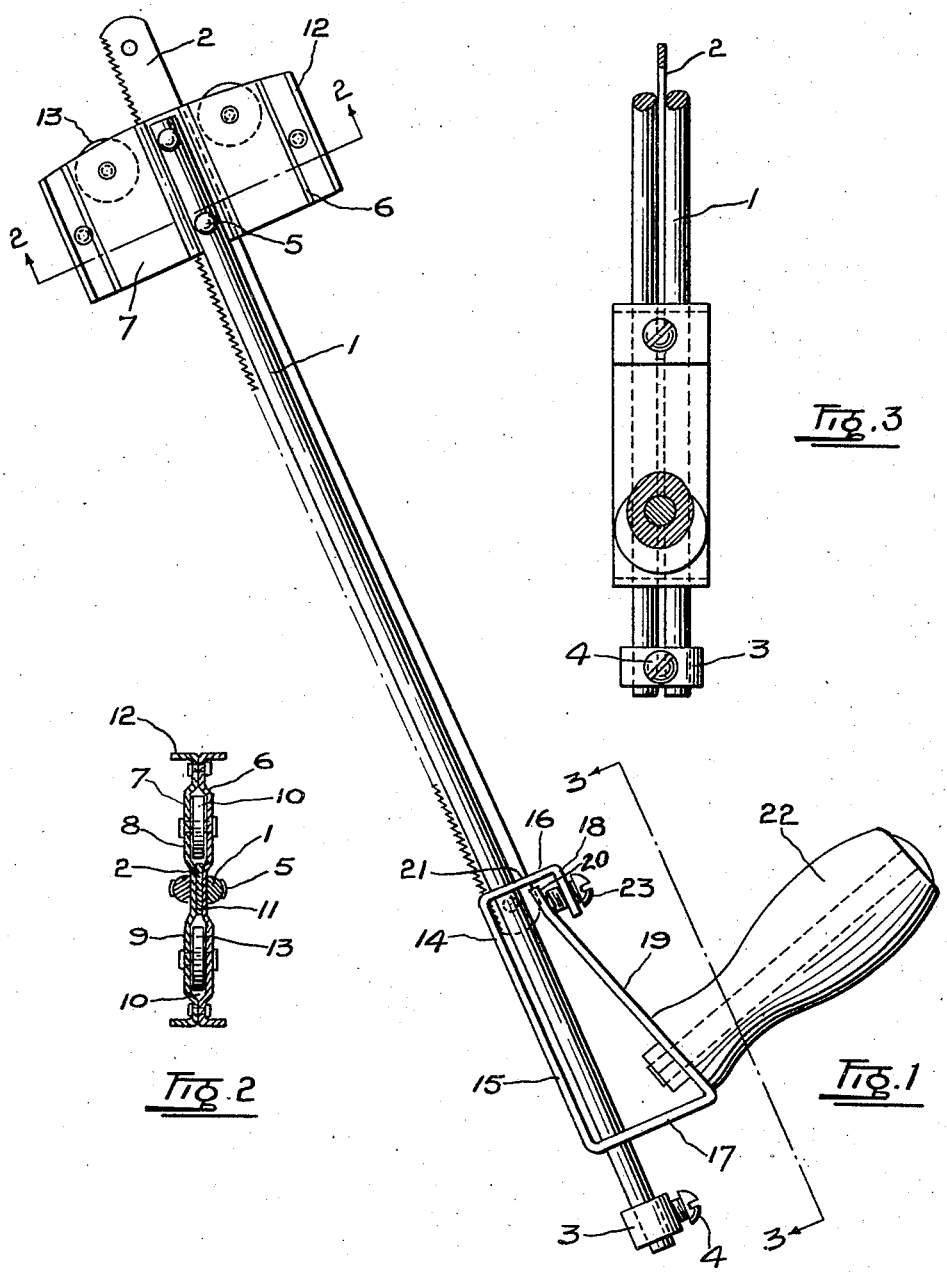
INVENTOR
JOHN J. JOHNSTON
BY
Fetherstonhaugh & Co
ATTORNEYS Patented Nov. 5, 1929

1,734,212

UNITED STATES PATENT OFFICE

JOHN J. JOHNSTON, OF VANCOUVER, BRITISH COLUMBIA, CANADA, ASSIGNOR TO JOHNSTON TOOL COMPANY, OF VANCOUVER, CANADA

SAW FRAME

Application filed June 25, 1928. Serial No. 288,208.

My invention relates to improvements in saw frames which are particularly adapted for the use of hack saw blades for hand or power use, for key hole saw blades and the like. The objects of the invention are to provide means whereby a thin flexible saw blade is supported against bending throughout that portion of its length which is not in or beyond its cut; to provide a guide immediately adjacent its cut whereby the cut can be made true to line and the saw prevented from whipping or breaking, and also to provide means whereby the saw blade is thrust longitudinally in the direction of the cut. A further and very important object of the invention is to provide a saw frame wherein a thin blade is mounted which will enable the user to make a saw cut of any length and in any place which is inaccessible to the accepted type of hack saw frame. With hack saw frames of the present accepted type, it is impossible to make a short cut close up to an abutment of any kind on account of the front end of the frame being in the way and being beyond the end of saw teeth, it is also impossible to make a cut in the centre of a plate which is more than twice the length and width of the distance between the saw teeth and the back of the hack saw frame, and it is with a view to overcoming these defects that this saw frame is designed.

The invention consists essentially of a longitudinal guide along which the saw is adapted to be thrust and a handle movable along said guide to which the saw is adapted to be secured that its free end may be projected beyond the end of the guide for cutting purposes, as will be more fully described in the following specification, and shown in the accompanying drawings, in which:—

Fig. 1 is a general view of the invention.

Fig. 2 is a sectional view of the saw head taken on the line 2—2 of Figure 1.

Fig. 3 is a part plan view taken on the line 3—3 of Figure 1.

In the drawings like characters of reference indicate corresponding parts in each figure.

The numeral 1 indicates generally a pair of guide rods circular in cross section and preferably of such small diameter as to allow a slight spring in their length, which rods are arranged parallel to each other to define an intervening space in which a saw blade 2 is endwise movable. The rear ends of the rods 1 are connected together by an apertured stop block 3, which is held in position by a set screw 4, so that the block may be set in any desired position to limit the length of the saw stroke and to prevent the saw blade from being withdrawn beyond a predetermined point. The forward ends of the rods 1 are flattened on their inner sides and are connected by rivets 5 to a head generally indicated by the numeral 6. The head 6 is preferably formed with a pair of plates 7 which are offset as at 8 and 9 to define spaces 10 and 11 respectively. The upper and lower extremities of the plates 7 are outwardly turned as at 12 to provide suitable surfaces for gripping the forward end of the frame.

In the spaces 10 rollers 13 are mounted which are so disposed as to project beyond the forward edge of the head 6 that it may move downwardly along the face of the work as the cut proceeds, these rollers also serve as antifriction devices for the upper and lower edges of the saw as it is moved endwise through the space 11.

Mounted upon the rods 1 is a slide 14 which consists of a strip of metal bent to form a horizontal base 15 having an upturned front end 16, an upturned rear end 17, a rearwardly bent lip 18 and a forwardly bent top member 19, the extremity 20 of which is extended below the lip 18. The front end 16 and the rear end 17 are apertured for the passage of the rods 1, the front end being also provided with a vertical slot 21 to receive the rear end of the saw 2. The member 19 is fitted with a handle 22 by which the slide is moved along its guide, and the lip 18 is provided with a clamping screw 23 which is driven down onto the extremity 20 of the member 19 to grip the rear end of the saw blade 2 between it and the forward end of the horizontal base 15.

Having thus described the several parts of my invention I will now briefly explain its use.

The saw is adapted to be clamped in the slide 14 in such a manner that it will pass freely through the space 11 of the head 5 without bearing on either of the rollers 13. The head is placed with the roller 13 engaging and movable along a face of the work so that when the head is pressed downwardly the upper roller is caused to bear against the back edge of the saw blade to form an anti-friction bearing therefor, the downward pressure upon the head tending to cause relative movement between the saw and the guides to the extent necessary to engage the upper roller with the saw blade.

It will thus be seen that I have invented a saw frame in which a saw is adapted to be reciprocally mounted, whereby it is guarded against breakage as it is thrust longitudinally into the cut, so that any desired pressure can be applied in a downward direction upon the saw.

What I claim as my invention is:

1. A saw structure comprising a guide, a saw blade movable along said guide, handle means for moving said blade and a head at one end of the guide equipped with upper and lower rollers spaced apart to provide an intervening passage through which an end of the saw blade is projected beyond said head, said lower roller being adapted to engage and travel along a face of the work and said upper roller being adapted to be engaged with the back edge of the saw blade to form a bearing therefor.

2. A saw structure as recited in claim 1 in which the blade is normally disposed to pass between said rollers without contacting therewith an in which the said guide is flexible with respect to the blade whereby a downward pressure upon the head brings the upper roller into engagement with the back edge of the saw blade.

3. A saw structure comprising a guide, a saw blade mounted within and movable longitudinally of said guide, a head at one end of the guide consisting of a pair of side plates secured together with the intermediate portions of the plates spaced apart to permit passage of the saw blade therebetween, upper and lower rollers mounted between said plates and projecting beyond the forward edges of the plates, and a handle slidable on the guide to which the rear end of the saw blade is connected so that engagement of the cutting edge of the blade with the work may tilt it relatively back, bringing the back edge of the blade against the roller.

4. A saw structure comprising a guide, a saw blade mounted within and movable longitudinally of said guide, a metal strip slidably carried by the guide and shaped to provide opposing clamping portions adapted to receive one end of the saw blade therebetween, one of said clamping portions being movable to and from the saw blade to grip or release the blade, means for securing said movable clamping portion in gripping engagement with said blade and a handle secured to said strip.

Dated at Vancouver, B. C., this 18th day of June, 1928.

JOHN J. JOHNSTON.